United States Patent

[11] 3,563,562

| [72] | Inventor | Eunice A. Carlin |
| --- | --- | --- |
| | | 5301 Hollywood Road, Edina, Minn. 55424 |
| [21] | Appl. No. | 825,365 |
| [22] | Filed | May 16, 1969 |
| [45] | Patented | Feb. 16, 1971 |

[54] DEVICE FOR RENDERING SNOWMOBILES AND THE LIKE TOWABLE
3 Claims, 3 Drawing Figs.

[52] U.S. Cl. .................................................. 280/19, 180/5
[51] Int. Cl. ...................................................... B62b 15/00
[50] Field of Search ............................................ 280/12, 18, 19, 28; 180/5

[56] References Cited
UNITED STATES PATENTS

| 1,091,402 | 3/1914 | Stout ............................. | 280/19 |
| 2,308,199 | 1/1943 | Longnecker ................. | 280/19 |
| 3,012,794 | 12/1961 | Barbiaux ....................... | 280/19 |
| 3,140,878 | 7/1964 | Davis............................. | 280/18 |

*Primary Examiner*—Benjamin Hersh
*Assistant Examiner*—Robert R. Song
*Attorney*—Merchant & Gould ABSTRACT: A sheet of plastic having holes adjacent the edges thereof affixed to the underside of a snowmobile so as to underlie the drive mechanism and form a runner thereunder to render a snowmobile towable.

PATENTED FEB 16 1971

3,563,562

INVENTOR.
EUNICE A. CARLIN

BY *Merchant & Gould*
ATTORNEYS

ન,563,562

DEVICE FOR RENDERING SNOWMOBILES AND THE LIKE TOWABLE

BACKGROUND OF THE INVENTION

1. Field of the Invention

In many instances, such as when a snowmobile breaks down, when an operator gets hurt, etc., it is desirable to move a snowmobile from one position to another without actually operating the machine. Further, quick and easy movement of machines may be desirable at places having many machines on hand, such as stores, servicing centers, etc.

2. Description of the Prior Art

In the prior art snowmobiles must be loaded on a device, such as trailers, trucks, etc., to move them from one place to another. Loading snowmobiles onto other vehicles is extremely time consuming and cumbersome. Also, it is an extremely laborious task to move many snowmobiles, by means of loading them on other vehicles, if it is required to move large numbers of snowmobiles short distances.

SUMMARY OF THE INVENTION

The present invention pertains to a device for rendering snowmobiles and the like towable including a sheet of material adapted to be fastened to the underside of the snowmobile to form a runner in underlying relation to the driving mechanism.

It is an object of the present invention to provide a device for rendering snowmobiles and the like towable.

It is a further object of the present invention to provide a method of rendering snowmobiles and the like towable.

It is a further object of the present invention to provide a device which is extremely inexpensive and simple to apply to a snowmobile to quickly and easily render the snowmobile towable for movement over the terrain without operating the snowmobile.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the FIGS.

DESCRIPTION OF THE PREFERRED EMBODIMENT

Figure 1:
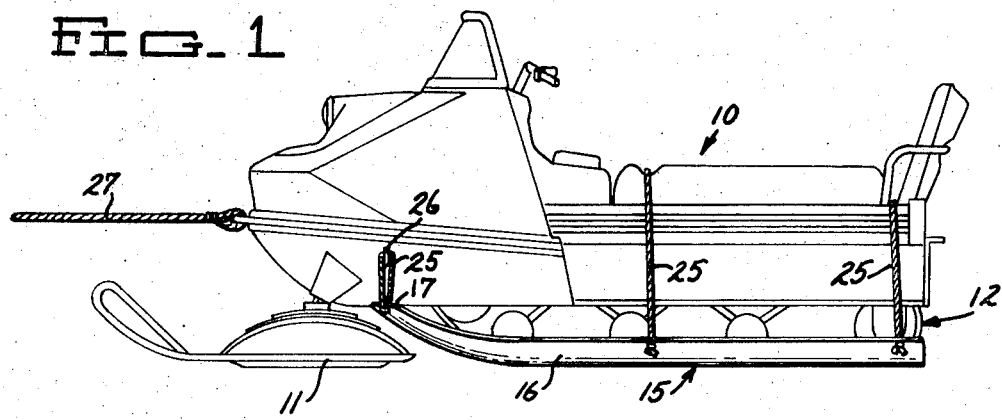
FIG. 1 is a view in side elevation of the present device installed on a snowmobile.

In the FIGS. the numeral 10 generally designates a snowmobile having a pair of front runners 11 and a driving mechanism generally designated 12. In the particular snowmobile 10 illustrated, the driving mechanism 12 includes an endless belt or track which operates on a plurality of rollers. It should be understood, however, that many other types of snowmobiles and vehicles are adaptable to the present device as will become apparent presently.

Figure 2:
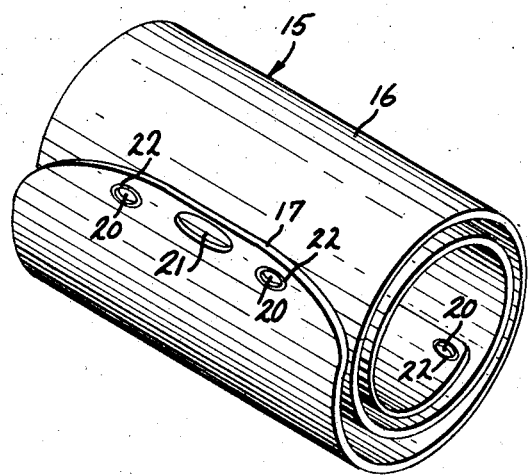
FIG. 2 is a view in perspective of the present device rolled into a stored position.
Figure 3:
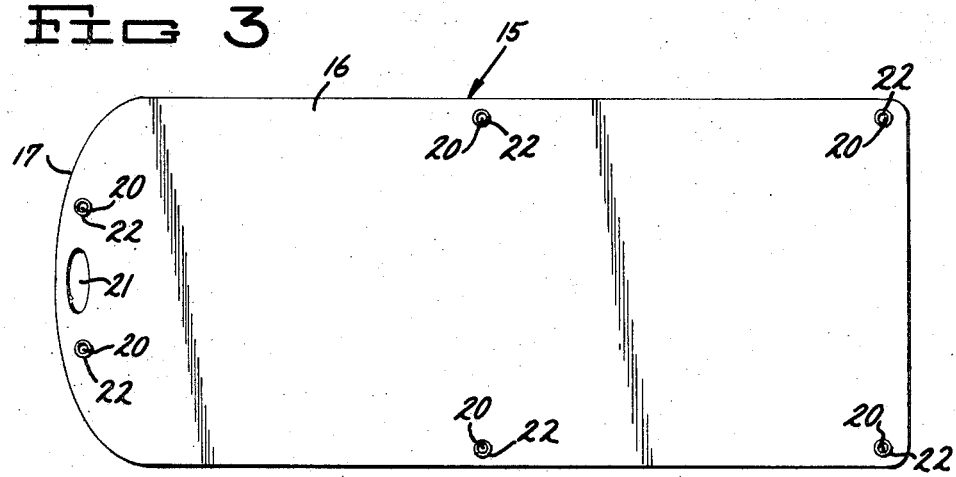
FIG. 3 is a view in top plan of the present device.

The present device, generally designated 15 is illustrated in the operating position in FIG. 1 and in a stored position in FIG. 2. The device includes an elongated generally rectangular-shaped piece of material 16 with a forward edge 17 having somewhat rounded corners for streamlining and ease of handling. In the present embodiment the piece of material 16 is formed of a piece of plastic, such as polyethylene or the like which is sufficiently flexible to allow it to be rolled for storage while being sufficiently thick to prevent wrinkling and the like. It should be understood that a great variety of materials might be utilized and the present plastic material is illustrated because of its convenience in storage as well as in operation.

The piece of material 16 has a plurality of holes 20 adjacent the edges thereof for affixing the piece of material 16 in the desired position. An opening 21 is also formed adjacent the forward edge 17 to be utilized as a handle for convenience of moving the piece of material 16 about. The holes 20 may be encircled with reinforcing grommets 22 if desired to add strength to the overall device 15 and prevent tearing, etc.

To place the device 15 in the correct position for rendering the snowmobile 10 towable, the driving mechanism 12 of the snowmobile 10 is positioned approximately centrally in overlying relationship on the piece of material 16. Ropes 25, or other affixing means such as tension springs, cables, etc., are affixed in the holes 20 and connected over the snowmobile 10 to pull the longitudinal edges of the piece of material 16 generally upwardly and form a trough around the driving mechanism 12. The forward edge 17 of the piece of material 16 is canted upwardly and positioned in juxtaposition to the underside of the body of the snowmobile 10 to prevent the build up of snow between the snowmobile 10 and the piece of material 16, or in front of the device 15. In the present embodiment ropes 25 are affixed in the holes 20 adjacent the forward edge 17 and connected to hooks 26, which hooks 26 are fixedly attached to the sides of the body of the snowmobile 10. Thus, the piece of material 16 is formed generally into a runner around the driving mechanism 12 so that the snowmobile 10 will slide freely over the surface of the snow.

The undersurface of the piece of material 16 is generally smooth to reduce friction between the snowmobile 10 and snow during towing of the snowmobile 10. However, it should be understood that longitudinal ridges or the like might be formed in the undersurface of the piece of material 16 to aid the snowmobile 10 in tracking correctly and the undersurface of the piece of material 16 would still be considered smooth.

In the present embodiment the piece of material 16 is illustrated with sufficient width so that the longitudinal edges thereof can be drawn up along the sides of the driving mechanism 12 to form a trough and prevent build up of snow throughout the driving mechanism 12. Also, the forward edge 17 is affixed in juxtaposition to the body of the snowmobile 10. It should be understood that undue build up of snow in the driving mechanism 12 or around the device 15 would produce additional drag and render the snowmobile 10 difficult to tow. However, it should be understood that the device 15 might be constructed with a width substantially equal to the width of the driving mechanism 12, in some embodiments, and the device 15 might operate satisfactorily for short distances.

One end of a rope or other flexible cable 27 is affixed to the snowmobile 10 and the opposite end is affixed to a draft vehicle (not shown). In the present embodiment the rope or flexible cable 27 is affixed to the snowmobile 10 by forming a loop around the body thereof. Since the device 15 renders the snowmobile 10 free to move over the surface of the snow, it is considered towable and any convenient means of moving the snowmobile 10, such as pulling, pushing, etc., can be utilized.

Thus, a device and method of rendering a snowmobile movable for quick and easy movement over the snow under the force of a draft vehicle, have been illustrated and described. The present device is inexpensive to construct and simple to operate. Further, because there is no necessity to load and unload the snowmobile 10 from the draft vehicle, the device is efficient and greatly reduces the time and work required in moving snowmobiles under power other than their own.

I claim:

1. A device for rendering snowmobiles and the like towable comprising:

a. a sheet of material having at least one substantially smooth surface;

b. said sheet of material being formable for canting the forward portion thereof generally upwardly;

c. means for affixing said sheet of material to the underside of a snowmobile and the like for forming a runner in underlying relation thereto with the forward portion thereof canted generally upwardly;

d. the sheet of material having a plurality of holes therethrough adjacent the edges for receiving the affixing means;

e. the means and some of the holes cooperating to position a portion of the forward edge of the sheet contiguous to the underside of the snowmobile body inwardly of the front end thereof for substantially preventing the buildup of snow therebetween.

2. A device as set forth in claim 1 wherein the sheet of material is formed of a relatively resilient plastic.

3. A method of rendering snowmobiles and the like towable comprising the steps of:

a. placing a sheet of material having a plurality of holes adjacent the edges thereof beneath the driving mechanism of the snowmobile and the like;

b. affixing flexible connecting means in the holes of said sheet of material; and c. attaching said flexible connecting means to the snowmobile and the like to form the sheet of material into a runner and maintain it fixedly in position with the forward edge of said sheet positioned inwardly of the front end of and contiguously to said snowmobile body.